May 3, 1927. 1,627,391
H. A. HOUSE
ARTICLE HANDLING MECHANISM
Original Filed April 30, 1926   2 Sheets-Sheet 2
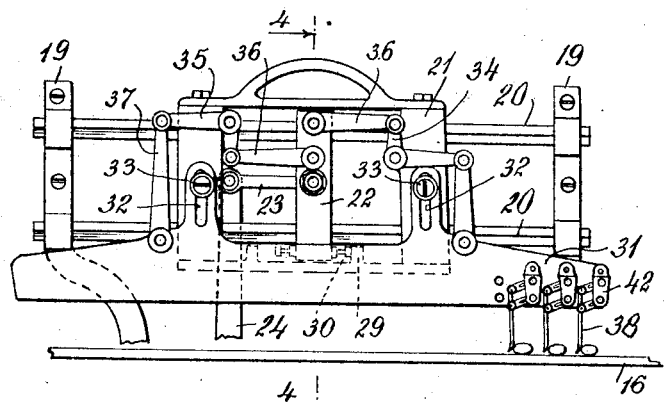
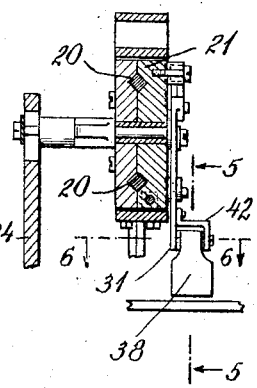
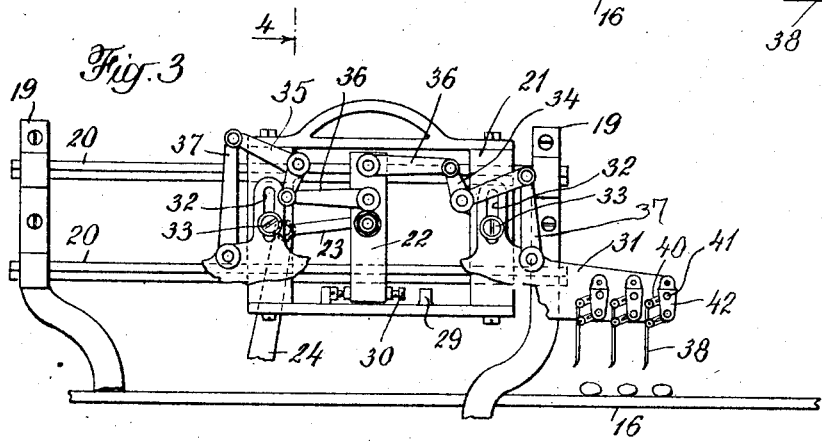
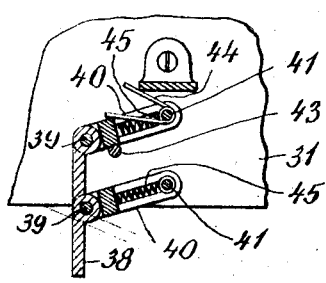
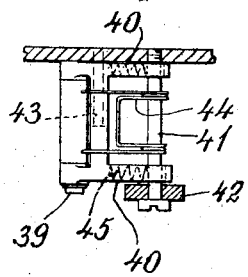
INVENTOR
Henry A. House
BY
Pennie, Davis, Marvin & Edmonds
ATTORNEYS Patented May 3, 1927.

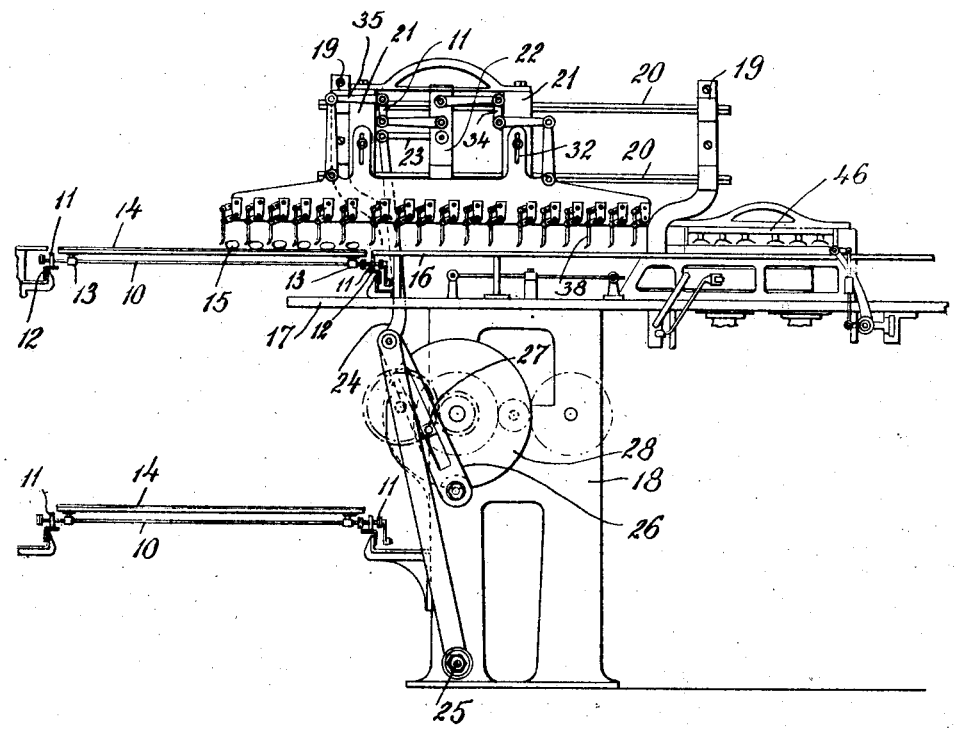

1,627,391

UNITED STATES PATENT OFFICE.

HENRY ALONZO HOUSE, OF BRIDGEPORT, CONNECTICUT, ASSIGNOR TO THE SHREDDED WHEAT COMPANY, OF NIAGARA FALLS, NEW YORK, A CORPORATION OF NEW YORK.

ARTICLE-HANDLING MECHANISM.

Original application filed April 30, 1926, Serial No. 105,683, now Patent No. 1,592,768, dated July 13, 1926. Divided and this application filed May 19, 1926. Serial No. 110,182.

This invention relates to apparatus for the manufacture of food products of the type in which uncooked products are placed on a conveyor and carried on the latter through an oven where they are baked, then removed from the conveyor and delivered to the place where they are packed in cartons. More specifically, the present invention is concerned with the mechanism for removing the products from the conveyor and this mechanism is constructed and arranged to remove the products and deliver them to the packing station in such a way as to facilitate their being packed in the cartons by automatic devices for the purpose. The present removal mechanism is of particular utility in connection with the manufacture of food products of a delicate structure, such as cereal biscuits of the shredded wheat type, and the adaptation of the invention to that use will accordingly be described, although it is to be understood that the utility of the invention is not limited to any particular type of product.

In one type of apparatus for the manufacture of shredded wheat biscuits, there is employed a conveyor which is provided with pans on which the unbaked biscuits are deposited in rows. These biscuits are produced by the operation of shredding devices which act on the cereal grain, shredding it to produce long strands or filaments. These filaments together compose a cereal layer which is subdivided into individual biscuits and in the operation of the device the cereal layer is continuously formed, divided into biscuits, and these biscuits deposited in rows in the conveyor pans while the latter are moving. The biscuits are carried on the conveyor through an oven and are there baked and then dried, this baking and drying operation resulting in the formation of a product of a fragile character which must be handled with extreme care in order to avoid injury.

The object of the present invention is to provide a device by which the baked biscuits may be removed rapidly from the conveyor and transferred without injury to the packing station, the device being so arranged that the biscuits are removed in groups suitable for introduction at once into the cartons, with each biscuit in a group under exact control. The exact control of each biscuit during its removal from the conveyor and delivery to the packing station is of great importance when an automatic packing device is to be used, since it permits the biscuits to be delivered in groups in which each of the biscuits in a group bears the proper relation to the other biscuits, so that the groups may be placed in the cartons without injury.

In one form of the device of the present invention there is employed a plurality of individual biscuit-engaging members or blades mounted on a reciprocating member which is moved to and fro in a direction transverse to the direction of movement of the conveyor. The pans of the conveyor are brought successively into registry with this group of blades and in the operation of the device the reciprocating member is moved out over the conveyor, then lowered so that the blades enter between adjacent biscuits in a row on the pan, then moved horizontally away from the conveyor to transfer the biscuits from the conveyor to a suitable receiving surface. At the end of its reciprocation, the member is raised so that the blades clear the biscuits and then the member is moved to its original position and the cycle of operations is repeated.

Preferably the number of blades carried by the reciprocating member is greater than the number of biscuits removed from the pan in a single operation, and acordingly in each reciprocation of the member a group of biscuits is removed from the pan in single file and other groups previously removed from the pans are advanced over the receiving surface by the blades. The movement of the biscuits over the surface consequently takes place in successive steps and the biscuits are transferred in groups from the conveyor to the carton filling devices with a step by step movement.

One embodiment of the invention is illustrated in the accompanying drawings, and in these drawings, Fig. 1 is a front view of the device, showing a portion of the conveyor and a part of the packing mechanism with which the device is intended to be used, Fig. 2 is a front view of a detail of the removal device, with certain parts removed, Fig. 3 is a view similar to Fig. 2, but showing parts broken away, Fig. 4 is a vertical section on the line 4—4 of Fig. 2, Fig. 5 is a vertical section on the line 5—5 of Fig. 4, and Fig. 6 is a section on the line 6—6 of Fig. 4.

Referring now to these drawings, portions of the conveyor are illustrated in Fig. 1, the conveyor being made up of a pair of chains, the links of which are pivotally mounted on the ends of transverse rods 10, these rods carrying rollers 11 which run on tracks 12. Each rod carries a pair of upstanding lugs 13 on which is supported a pan 14 and, as shown in Fig. 1, the conveyor passes the removal mechanism in upper and lower horizontal stretches. Each pan brought into registry with the removal device contains a transverse row of biscuits, one of which is designated 15, these biscuits having been deposited in unbaked condition on the conveyor and then carried through the oven and drier.

In the operation of the conveyor, the pans carrying baked biscuits are brought successively into registry with a supporting platform 16 suitably mounted above the bed plate 17 of the machine which is mounted on the top of a standard 18. Mounted in uprights 19 are horizontal guide rods 20 on which are slidably mounted a main head 21 and a supplementary head 22. The head 22 has a link connection 23 with a rock lever 24 pivotally mounted at 25 on the standard 18, and actuated by a supplementary lever 26 connected pivotally to lever 24 intermediate its ends, the lever 26 being swung by a block 27 carried eccentrically on disc 28 rotated in any convenient way.

As shown more clearly in Figs. 2 and 3, the head 22 has a limited movement relative to the head 21, the latter having stop blocks 29 against which abut adjustment screws 30 carried by the lower end of the head 22. When the lever 24 is swung in either direction, the head 22 has a movement relative to head 21 until one or the other of the screws 30 strikes the stop block in its path of movement and thereafter both heads 21 and 22 are moved in unison.

Mounted on the head 22 is a plate 31 vertically slotted, as shown at 32. Pins 33 carried by the head 21 enter the slots 32, thus permitting the plate 31 to have a vertical movement relative to head 21. The head 21 carries bell cranks 34 and 35 pivotally mounted thereon and connected by links 36 to pins carried on head 22. These bell cranks are also connected by links 37 to the plate 31 and in the operation of the device, the initial movement of head 22 relative to head 21 in each reciprocation causes the bell cranks to be swung so as to raise or lower the plate 31. The arrangement of the bell cranks is such that when the heads are in the extreme position to the left, with reference to Fig. 2, the movement of the head 22 to the right results in the swinging of the bell cranks to cause the plate 31 to be lowered to the position illustrated in Fig. 2. The heads and the plate remain in the position there shown until the heads have reached the end of their stroke to the right and when head 22 starts to the left again, its initial movement relative to head 21 causes a swinging of the bell cranks which raises the plate 31 to the position shown in Fig. 3.

Mounted on the plate 31 is an aligned series of blades 38 and each blade has pivot pins 39 connecting the blade with parallel movement links 40, the other ends of these links being mounted on pivot pins 41 supported at their outer ends in brackets 42 secured to the plate or frame 31, and at their other ends received in apertures in the plate. Each blade is normally held in its lower position with one of the links bearing against a stop pin 43 by means of a spring 44, and with this construction the blades are capable of a vertical movement, and as the springs are light, the blades will yield upwardly if they encounter a slight resistance when the frame 31 is lowered. The links 40 are slotted and the pins 41 lie in the ends of these slots, being held there by the action of springs 45. With this arrangement, the blades are capable of a lateral yielding movement against the tension of the springs 45 and as the springs are relatively weak, the blades will yield readily if they encounter resistance, injury thus being avoided to biscuits which may be out of place.

It will be noted that the frame 31 has eighteen teeth, but when this frame is in its extreme position to the left and overlying the conveyor (Fig. 1) only six of the blades are in position to engage biscuits on the pan. When the frame is moved to the right, the biscuits are transferred from the pan to the supporting surface, and upon the next withdrawal stroke of the device, this group of biscuits is engaged by a set of blades on the frame and advanced along the surface, while another group of biscuits is transferred from a pan to the surface. During the operation of the device, therefore, the biscuits are moved from a pan of the conveyor in single file to the supporting surface and then moved over this surface in successive steps, still in single file. The biscuits are eventually deposited in front of a packing device, generally designated 46, and of which only parts are shown. At this packing device the group of six biscuits delivered at each stroke of the removal mechanism is fed to a pair of cartons, three biscuits to each carton, the biscuits being placed in the cartons in the same arrangement that they had while being removed from the conveyor.

The conveyor with which the device is to be used is preferably given an intermittent movement with respect to those pans or trays from which biscuits are to be removed, and the movement of the conveyor and the operation of the removal mechanism is timed so that the pans are brought successively into registry with the supporting surface, and as each pan comes to rest the frame is lowered, the blades engage the biscuits, and the biscuits are pushed by the blades to the surface. The conveyor is arranged to carry twelve biscuits in each pan, and the present device removes only six biscuits at each stroke. It is intended, consequently, to use two removal devices in connection with the conveyor, the devices removing groups of six biscuits at each stroke in opposite directions to packing devices placed on each side of the conveyor.

It will be seen that the present mechanism permits rapid transfer of the biscuits from the conveyor to the filling station, and in this transfer each biscuit is under separate control. The biscuits are discharged in single file and are thus in proper position to be at once introduced into the cartons by the packing devices. As the blades are yieldable, the biscuits can be handled without damage, although these biscuits are of delicate construction and thus readily subject to injury.

This application is a division of Patent No. 1,592,768 issued July 13, 1926, on an application Serial Number 105,683, filed Apr. 30, 1926 in my name copending with the present application.

I claim:

1. In apparatus of the type described, the combination of a conveyor and means for successively removing transverse rows of biscuits, each row in single file, therefrom.

2. In apparatus of the type described, the combination of a conveyor and horizontally reciprocating means for successively removing transverse rows of biscuits, each row in single file, therefrom.

3. In apparatus of the type described, the combination of a conveyor having transverse trays, a platform, and horizontally reciprocatory means for successively removing transverse rows of biscuits in single file from said trays to said platform and including a pusher member for each biscuit in the tray and for each biscuit upon the platform.

4. In apparatus of the type described, the combination of a conveyor, and means for successively removing transverse rows of biscuits, each row in single file, from said conveyor including vertical pusher members one for each biscuit, and means for moving said pusher members vertically downward to engage between the biscuits, horizontally to remove the biscuit, vertically upward, and horizontally to first position.

5. In apparatus of the type described, the combination of a conveyor adapted to carry biscuits, and mechanism for removing groups of biscuits from the conveyor in single file, this mechanism including a member engaging each biscuit in a group.

6. In apparatus of the type described, the combination of a conveyor adapted to carry biscuits, and mechanism reciprocating in a direction transverse to the direction of conveyor movement and operating to remove groups of biscuits from the conveyor in a single file.

7. In apparatus of the type described, the combination of a conveyor adapted to carry biscuits, an aligned series of members for engaging single biscuits arranged in a row on the conveyor, and means for moving the series of members as a unit longitudinally toward and away from the conveyor and for raising and lowering the members as a unit at opposite ends of their path of travel.

8. In apparatus of the type described, the combination of a conveyor adapted to carry biscuits, a platform disposed adjacent the conveyor, and means for successively transferring groups of biscuits from the conveyor to the platform and for moving the groups of biscuits along the platform in successive steps.

9. In apparatus of the type described, the combination of a conveyor adapted to carry biscuits, a platform disposed adjacent the conveyor, reciprocating mechanism movable over the platform and the conveyor and including a plurality of members, each of which is adapted to engage a single biscuit, and means for operating the mechanism to transfer a group of biscuits from the conveyor to the platform and for moving each transferred group over the platform in successive steps.

10. In apparatus of the type described, the combination of a conveyor provided with trays, each of which is adapted to carry a number of biscuits, mechanism for removing a group of biscuits from each tray in single file including a plurality of members for engaging single biscuits in a row on the conveyor, and means for moving the members as a unit toward and away from the conveyor and for raising and lowering the members as a unit at spaced points in their path of travel.

In testimony whereof I affix my signature.

HENRY ALONZO HOUSE.